US007263425B2

(12) United States Patent
Bleile et al.

(10) Patent No.: US 7,263,425 B2
(45) Date of Patent: Aug. 28, 2007

(54) METHOD AND DEVICE FOR OPERATING AN INTERNAL COMBUSTION ENGINE

(75) Inventors: Thomas Bleile, Stuttgart (DE); Christina Stiller, Stuttgart (DE); Friedrun Heiber, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/408,699

(22) Filed: Apr. 20, 2006

(65) Prior Publication Data

US 2006/0277984 A1 Dec. 14, 2006

(30) Foreign Application Priority Data

Apr. 20, 2005 (DE) ...................... 10 2005 018 272

(51) Int. Cl.
*G01M 19/00* (2006.01)
*G06F 17/18* (2006.01)

(52) U.S. Cl. ...................... 701/102; 73/118.2; 702/179

(58) Field of Classification Search ................ 701/102, 701/103, 108, 114, 115; 123/568.21, 568.22, 123/568.23, 568.24, 361, 396, 399, 403; 73/118.2
See application file for complete search history.

(56) References Cited

U.S. PATENT DOCUMENTS 4,327,699 A * 5/1982 Reiff et al. ............ 123/568.18
5,526,266 A * 6/1996 Rutan et al. ................ 701/100
6,082,325 A * 7/2000 Digeser et al. ............. 123/299
6,422,216 B1 * 7/2002 Lyko et al. ............ 123/568.11

FOREIGN PATENT DOCUMENTS

WO WO92/13184 A1 * 8/1992

* cited by examiner

*Primary Examiner*—Willis R. Wolfe
*Assistant Examiner*—Johnny H. Hoang
(74) *Attorney, Agent, or Firm*—Kenyon & Kenyon LLP

(57) ABSTRACT

In a method and device for operating an internal combustion engine having an adjustable component through which a gas flows and by whose setting the gas flowing through the component is influenced, at least one first value representative of a flow-through area of the component is determined in accordance with a first model as a function of a triggering signal of the component, at least one second value representative of the flow-through area of the component is determined in accordance with a second model as a function of at least one performance quantity of the internal combustion engine different from the triggering signal, and a resulting value is formed for the flow-through area as a mean of the at least one first value and the at least one second value.

17 Claims, 2 Drawing Sheets

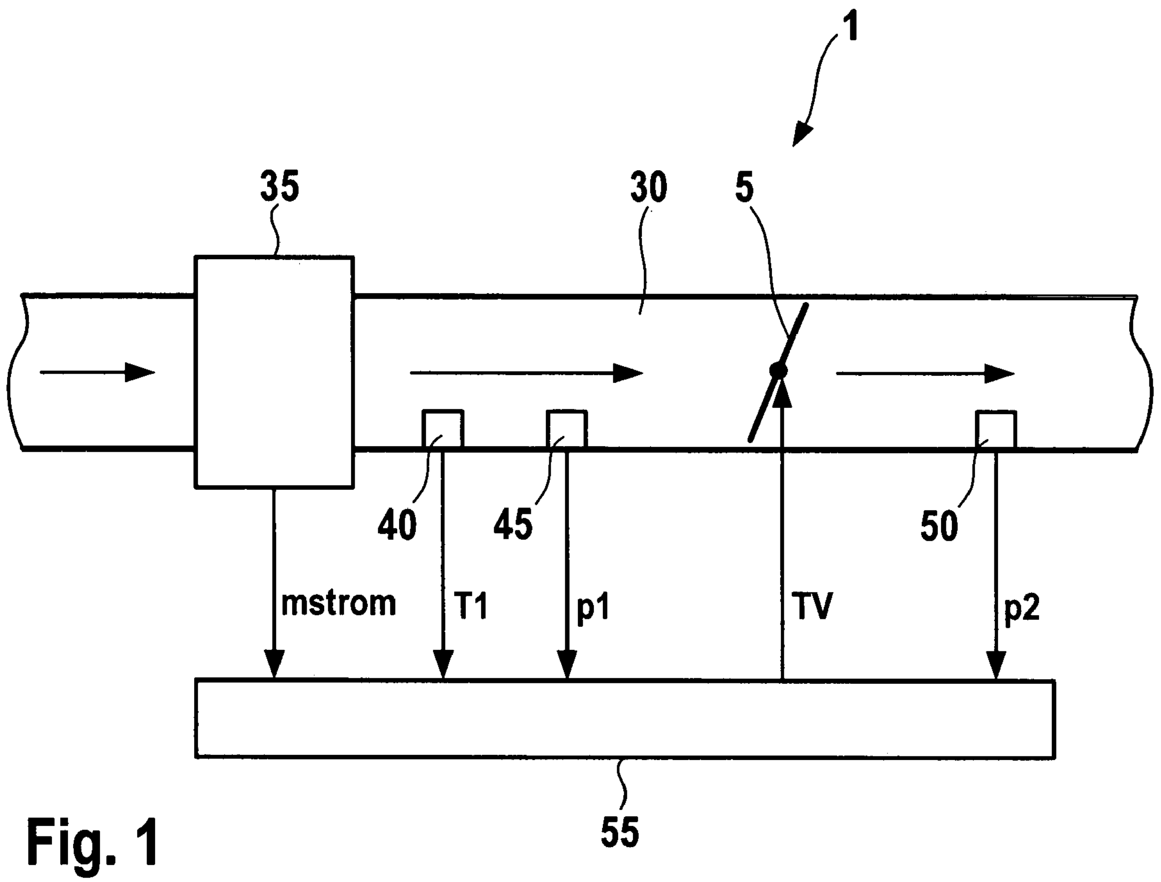
Fig. 1
Fig. 3
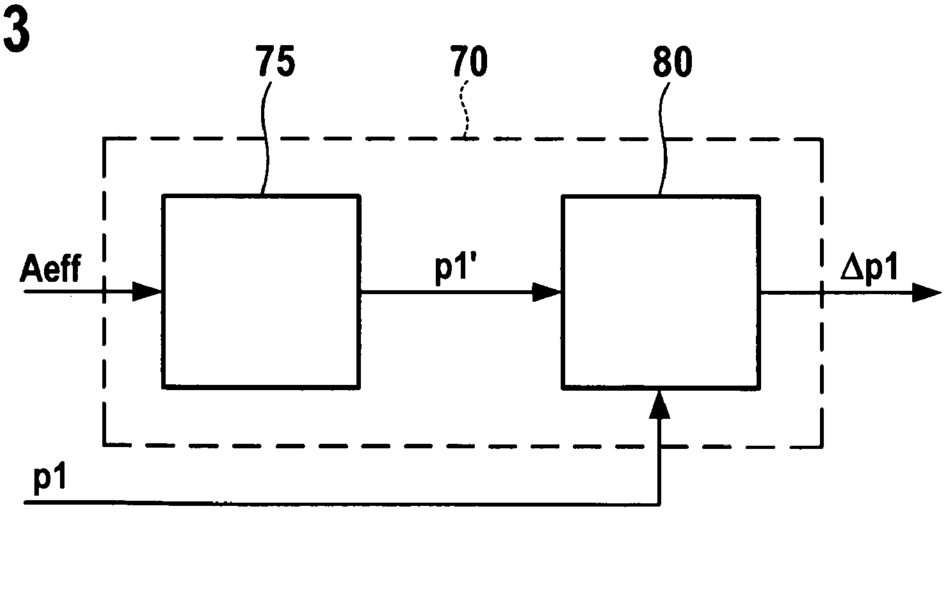

METHOD AND DEVICE FOR OPERATING AN INTERNAL COMBUSTION ENGINE

CROSS-REFERENCE TO RELATED APPLICATIONS

This application claims priority to Application No. 10 2005 018 272.0, filed in the Federal Republic of Germany on Apr. 20, 2005, which is expressly incorporated herein in its entirety by reference thereto.

1. Field of the Invention

The present invention relates to a method and a device for operating an internal combustion engine.

2. Background Information

There are believed to be conventional methods and devices for operating an internal combustion engine in which the engine has an adjustable component through which a gas flows and the setting of which influences the gas flowing through it. This is believed to be conventional, for example, for a throttle valve in an air supply to such an internal combustion engine, the air flow rate being influenced by the air supply as a function of the setting of the throttle valve.

SUMMARY

A method and device for operating an internal combustion engine according to example embodiments of the present invention may provide that at least one first value which is representative of a flow-through area of the component, e.g., the effective flow-through area, is determined with the help of a first model as a function of a triggering signal of the component, and the at least one second value which is representative of the area of the flow-through area of the component, e.g., the effective flow-through area, is determined with the help of the second model as a function of at least one performance quantity of the internal combustion engine which is different from the triggering signal, and a resulting value for the flow-through area, e.g., the effective flow-through area, is formed as the average of the at least one first value and the at least one second value. It may be possible in this manner to determine with the greatest possible accuracy the area of the flow-through area of the component, e.g., the effective flow-through area, under all operating conditions of the internal combustion engine. If the resulting value for the area of the flow-through area of the component, e.g., the effective flow-through area, is used for model-based control or regulation of the setting of the adjustable component, then the quality of this model-based control or regulation may be greatly improved on the basis of the greatest possible accuracy of the resulting value.

The accuracy of the resulting value for the area of the adjustable flow-through area of the component, e.g., the effective flow-through area, may be easily increased, e.g., optimized, when the at least one first value and the at least one second value are averaged with weighting to form the resulting value.

The weighting may be particularly simple and reliable since, depending on the tolerances of the first model and/or depending on the variance of the triggering signal, a variance of the at least one first value may be determined, and the weighting of the at least one first value may be determined as a function of the variance of the at least one first value.

Accordingly, the weighting may be designed to be particularly simple and reliable if a variance of the at least one second value is determined as a function of tolerances of the second model and/or as a function of a variance of the at least one performance quantity of the internal combustion engine different from the triggering signal, this quantity being modeled or measured, and the weighting of the at least one second value is determined as a function of the variance of the at least one second value.

For a high reliability of the weighting, it may be provided that the weighting of a value representative of the area of the flow-through area of the component, e.g., the effective flow-through area, is selected to be greater, the smaller its variance.

A particularly simple and reliable modeling of the at least one second value may be possible with the help of the second model as a function of a first pressure upstream from the component, a second pressure downstream from the component, a temperature upstream from the component and a flow rate through the component.

It may be provided that a corrected value for an input quantity of the second model is formed as a function of the resulting value via the second model. This also may make it possible to improve the accuracy of the second value as an output quantity of the second model and thus also the accuracy of the resulting value on the whole.

The method and device hereof may be used for a component designed as a throttle valve, an exhaust gas recirculation valve, as a turbine, etc.

According to an example embodiment of the present invention, a method for operating an internal combustion engine having an adjustable component through which a gas flows and by whose setting the gas flowing through the component is influenced, includes: determining at least one first value representative of a flow-through area of the component in accordance with a first model as a function of a triggering signal of the component; determining at least one second value representative of the flow-through area of the component in accordance with a second model as a function of at least one performance quantity of the internal combustion engine different from the triggering signal; and forming a resulting value for the flow-through area as a mean of the at least one first value and the at least one second value.

The internal combustion engine may be arranged in a motor vehicle.

The at least one first value may be representative of an effective flow-through area of the component.

The at least one second value may be representative of an effective flow-through area of the component.

The resulting value may be formed in the forming step by averaging the at least one first value and the at least one second value with weighting.

The method may include determining a variance of the at least one first value at least one of (a) as a function of tolerances in the first model and (b) as a function of a variance of the triggering signal, the weighting of the at least one first value determined as a function of the variance of the at least one first value.

The method may include determining a variance of the at least one second value at least one of (a) as a function of tolerances of the second model and (b) as a function of a variance of the at least one of (a) a modeled and (b) a measured performance quantity of the internal combustion engine different from the triggering signal, the weighting of the at least one second value determined as a function of the variance of the at least one second value.

The weighting of a value representative of the flow-through area of the component may be selected to be the greater, the smaller its variance.

The at least one second value may be determined in accordance with the second model as a function of a first pressure upstream from the component, a second pressure downstream from the component, a temperature upstream from the component and a mass flow rate through the component.

The method may include forming a corrected value for at least one input quantity of the second model as a function of the resulting value via the second model.

The component may include at least one of (a) a throttle valve, (b) an exhaust gas recirculation valve and (b) a turbine.

The flow-through area of the component may be an effective flow-through area.

According to an example embodiment of the present invention, a device for operating an internal combustion engine having an adjustable component through which a gas flows and by whose setting the gas flowing through is influenced, includes: at least one first modeling unit adapted to model a first value representative of a flow-through area of the component as a function of a triggering signal of the component; at least one second modeling unit adapted to model a second value representative of the flow-through area of the component as a function of at least one performance quantity of the internal combustion engine different from the triggering signal; and an averaging unit adapted to form a resulting value for the flow-through area as a mean of the at least one first value and the at least one second value.

The internal combustion engine may be arranged in a motor vehicle.

The flow-through area of the component may be an effective flow-through area.

Exemplary embodiments of the present invention are described in greater detail below with reference to the appended Figures.

An exemplary method and/or an exemplary device is provided for operating an internal combustion engine, e.g., of a motor vehicle, may permit a most accurate possible determination of a value for the flow-through area, e.g., the effective flow-through area, of a component arranged in a gas channel. The internal combustion engine has an adjustable component through which a gas flows and by whose setting the gas flowing through is influenced. At least one first value representative of a flow-area of the component, e.g., the effective flow-through area, is determined in accordance with a first model as a function of a triggering signal of the component. At least one second value representative of the flow-through area of the component, e.g., the effective flow-through area, is determined in accordance with a second model as a function of at least one performance quantity of the internal combustion engine different from the triggering signal. A resulting value is formed for the flow-through area, e.g., the effective flow-through area, as the mean of the at least one first value and the at least one second value.

BRIEF DESCRIPTION OF THE DRAWINGS

FIG. 1 is a schematic view of an adjustable component of an internal combustion engine, with gas flowing through the component.

FIG. 3 is a block diagram for correction of an input quantity of a second model used to form the resulting value.

DETAILED DESCRIPTION

Figure 2:
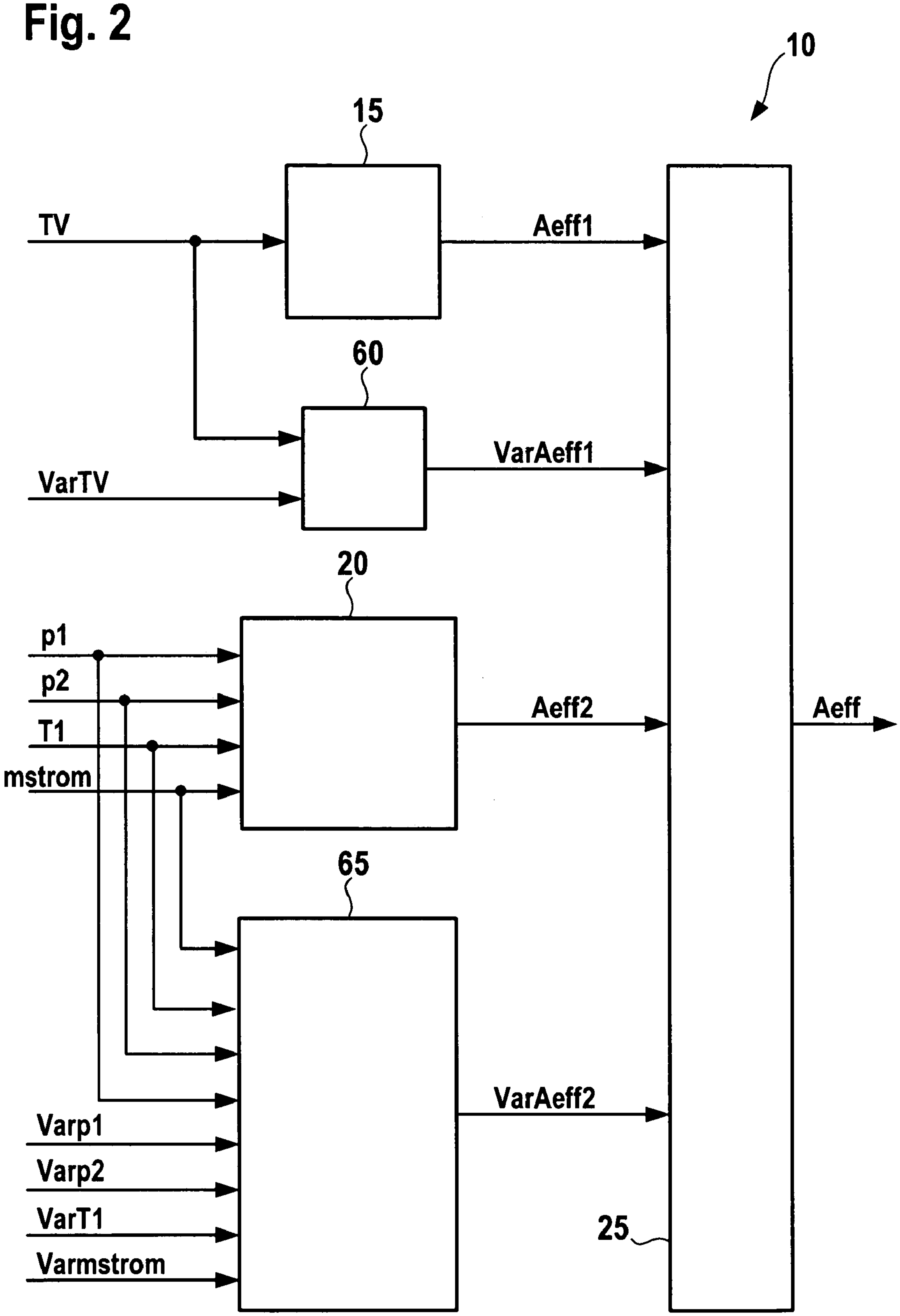
FIG. 2 is a block diagram illustrating a method and device according to an example embodiment of the present invention with regard to the determination of a resulting value for the area of the adjustable flow-through area of the component, e.g., the effective flow-through area.

FIG. 1 illustrates an exemplary detail of an internal combustion engine 1, which drives a motor vehicle, for example. FIG. 1 illustrates a gas channel 30 in which there is an adjustable component 5 through which a gas flows in gas channel 30 and the setting of which influences the gas flowing through, e.g., with respect to the gas flow rate in gas channel 30. The direction of flow of the gas in gas channel 30 is indicated by arrows in FIG. 1. Upstream from component 5, a flow meter 35 is arranged in gas channel 30, measuring gas flow rate mstrom and relaying the measured value to a control unit 55. Alternatively the gas flow rate may also be modeled from other performance quantities of the internal combustion engine. Upstream from component 5 and downstream from flow meter 35, a temperature sensor 40 is arranged in gas channel 30, measuring temperature T1 of the gas in gas channel 30 upstream from component 5 and relaying the measured value to control unit 55. Upstream from component 5 and (but not necessarily) downstream from temperature sensor 40, a first pressure sensor 45 arranged in gas channel 30 measures a first pressure p1 upstream from component 5 in gas channel 30 and relays the measured value to control unit 55. Downstream from component 5, a second pressure sensor 50 arranged in gas channel 30 measures a second pressure p2 downstream from component 5 in gas channel 30 and relays the measured value to control unit 55. Control unit 55 controls component 5 for implementing a preselected setting via a triggering signal TV, e.g., to adjust a defined gas flow rate mstrom in gas channel 30.

Gas channel 30 may be, for example, the air supply to internal combustion engine 1, in which case adjustable component 5 would be arranged as a throttle valve, for example. However, gas channel 30 may also be an exhaust system of internal combustion engine 1, in which case adjustable component 5 would be a turbine of an exhaust gas turbocharger, for example, whose degree of opening, e.g., area of through-flow, is variable by varying the turbine geometry or via a bypass. Gas channel 30 may also be, for example, an exhaust gas recirculation channel, connecting an exhaust system of internal combustion 1 to the air supply of internal combustion engine 1, component 5 then being arranged as an exhaust gas recirculation valve, for example.

Internal combustion engine 1 may be arranged as a gasoline engine or a diesel engine, for example.

Triggering signal TV for component 5 may be, for example, a PWM signal having a variable pulse duty factor, a corresponding degree of opening of component 5 being adjustable, depending on the selected pulse duty factor, and thus a corresponding flow-through area of component 5 also being adjustable. If component 5 is arranged as a throttle valve, control unit 55 may generate triggering signal TV for implementation of a driver's intent, e.g., by a conventional method. If component 5 is arranged as a turbine of an exhaust gas turbocharger, triggering signal TV may be adjusted, e.g., by a conventional method, e.g., to form a desired charging pressure setpoint. If component 5 is arranged as an exhaust gas recirculation valve, triggering signal TV may be adjusted, e.g., to achieve a desired air/fuel mixture ratio, e.g., by a conventional method.

According to example embodiments of the present invention, at least one first value Aeff1, which is representative of a flow-through area of component 5, e.g., the effective flow-through area, is determined in accordance with a first model as a function of triggering signal TV of component 5 and at least one second value Aeff2, which is representative of the flow-through area of component 5, e.g., the effective flow-through area, is determined in accordance with a second model as a function of at least one performance quantity of internal combustion engine 1 different from triggering signal TV, and a resulting value Aeff for the flow-through area, e.g., the effective flow-through area, is formed as the mean of the at least one first value Aeff1 and the at least one second value Aeff2. The procedure described herein may be implemented, e.g., in accordance with a device 10, as illustrated in FIG. 2. In the following description, it is assumed, as an example, that exactly one first value Aeff1 and exactly one second value Aeff2 are determined. Both values Aeff1, Aeff2 represent an estimate of the effective flow-through area of adjustable component 5, e.g., an estimate of the area of component 5 through which gas actually flows.

Triggering signal TV is thus sent to a first modeling unit 15, which determines first value Aeff1 for the effective flow-through area of adjustable component 5 as a function of triggering signal TV. To this end, first modeling unit 15 may be arranged as a characteristic curve, for example, calibrated on a test bench. Resulting first value Aeff1 for the particular effective flow-through area of component 5 is measured on this test bench for various values of triggering signal TV, e.g., by a conventional method. Measured first values Aeff1 are stored in the characteristic curve of first modeling unit 15 via the particular values for triggering signal TV. In operation of internal combustion engine 1, e.g., first value Aeff1 for the effective flow-through area of component 5 is read out via this characteristic curve by first modeling unit 15 as a function of the instantaneous value of triggering signal TV in operation of internal combustion engine 1. The characteristic curve may be interpolated between individual calibrated measuring points to obtain a particular first value Aeff1 for all possible values TV of the triggering signal. First value Aeff1 is then sent to an averaging unit 25.

In a simple example, triggering signal TV may be the pulse duty ratio itself output by control unit 55. In this regard, triggering signal TV is a manipulated variable for component 5. However, a signal representative of the actuator position of component 5 may also be used as the triggering signal, e.g., the valve lift reported by component 5 back to control unit 55 in the instance of the arrangement of component 5 as a valve and/or the degree of opening of component 5 in general.

Input quantities sent to a second modeling unit 20 include first pressure $p_1$, second pressure $p_2$, temperature $T_1$ and gas flow rate mstrom, these values being measured by sensors 45, 40, 35 illustrated in FIG. 1 or modeled from performance quantities of internal combustion engine 1, e.g., by a conventional method. Although the characteristic curve stored in first modeling unit 15 represents a first model, a second model stored in second modeling unit determines from the input quantities described above a second value Aeff2 for the effective flow-through area of component 5 and relays this second value to averaging unit 25. The second model may be modeled on a test bench, e.g., in the form of an engine characteristics map, for example. Second model 20, however, may also be in the form of the known throttle equation in second modeling unit 20, which is written as follows:

$$mstrom = \frac{Aeff2 * p_1}{\sqrt{R * T_1}} * \psi(\pi) \tag{1}$$

where $$\pi = p_1 / p_2. \tag{2}$$

R represents the gas constant of the gas flowing through gas channel 30 and ψ is the known flow-through function. When throttle equation (1) is solved for Aeff2, this yields the model stored in second modeling unit 20 as follows:

$$Aeff2 = \frac{mstrom * \sqrt{R * T_1}}{p_1 * \psi(\pi)}. \tag{3}$$

Averaging unit 25 forms the mean from first value Aeff1 and second value Aeff2. This mean then corresponds to a resulting value Aeff for the effective flow-through area of component 5 in gas channel 30. The mean may be, for example, the arithmetic mean or the geometric mean. It is assumed below as an example that it is the arithmetic mean, e.g., $$Aeff = Aeff1/2 + Aeff2/2 \tag{4}.$$

An improvement in accuracy of resulting value Aeff may be achieved by weighting and averaging first value Aeff1 and second value Aeff2 to form resulting value Aeff. To this end, a variance of the at least one first value Aeff1 is determined as a function of tolerances of the first model and/or as a function of a variance of triggering signal TV and the weighting of the at least one first value Aeff1 is determined as a function of the variance of the at least one first value Aeff1. Additionally or alternatively, a variance of the at least one second value Aeff2 is determined as a function of tolerance of the second model and/or as a function of a variance of the at least one modeled or measured performance quantity of internal combustion engine 1, this performance quantity being different from triggering signal TV, and determining the weighting of the at least one second value Aeff2 as a function of the variance of the at least one second value Aeff2. In the present example, exactly one first value Aeff1 and exactly one second value Aeff2 are be considered, as described. Tolerances in the first model, e.g., in first modeling unit 15 in this example of the characteristic curve, may result from inaccuracies in the calibration of this characteristic curve, for example. However, the tolerances in the first model may also be due to manufacturing tolerances in the actuator of component 5. These tolerances in the first model result in a variance VarAeff1 of first value Aeff1 even with a correct triggering signal TV. However, a variance in triggering signal TV itself contributes toward this variance VarAeff1 of first value Aeff1, and this variance in the triggering signal may also result from a measurement-induced and/or modeling-induced tolerance in the formation of triggering signal TV by control unit 55. When speaking of variance in this exemplary embodiment, it should be understood to refer to the variance in the statistical sense, e.g., the square of the standard deviation. Alternatively, the term variance may also include other tolerances or deviations from the correct value, e.g., even the standard deviation itself. Triggering signal TV and variance VarTV of the triggering signal are sent as input quantities to a third modeling unit 60, which may be arranged as an engine characteristics map, for example. The engine characteristics map of third modeling unit 60 may be calibrated on a test bench, for example, supplying as the output quantity variance VarAeff1 of first value Aeff1, which is in turn sent to averaging unit 25.

If only triggering signal TV is sent to third modeling unit 60, third modeling unit 60 may also contain a characteristic curve calibrated on a test bench, for example, determining variance VarAeff1 of first value Aeff1 as a function of triggering signal TV, only the tolerances of the first model of first modeling unit 15 being taken into account in this instance. If only variance VarTV of triggering signal TV is sent to third modeling unit 60, then a characteristic curve also calibrated on a test bench, for example, may be used in the third modeling unit 60, determining variance VarAeff1 of first value Aeff1 as a function variance VarTV of the triggering signal, in this instance only the variance of the triggering signal being taken into account. Only when both triggering signal TV and variance VarTV are supplied to third modeling unit 60 in the manner described above and converted there into variance VarAeff1 of first value Aeff1 according to the engine characteristics map described above is it possible to take into account both the tolerance of the first model and the variance of triggering signal VarTV for variance VarAeff1 of first value Aeff1.

Variance VarAeff2 of second value Aeff2 may be determined via a fourth modeling unit 65. Inaccuracies in the second model stored in second modeling unit 20 and also the variance of the input quantities of second modeling unit 20 may result in variance VarAeff2 of second value Aeff2. The inaccuracies in the second model to form VatAeff2 of second value Aeff2 may be taken into account by sending the input quantities of second modeling unit 20 to fourth modeling unit 65, as illustrated in FIG. 2, and then mapping variance VarAeff2 of second value Aeff2 in an engine characteristics map calibrated on a test bench, for example, and stored in fourth modeling unit 65. Additionally or alternatively, variance Varp1 of the first pressure and/or variance Varp2 of the second pressure and/or variance VarT1 of the temperature and/or variance Varmflow of gas flow rate may be sent as input quantities to fourth modeling unit 65 to take into account their influence on variance varAeff2 of second value Aeff2. The engine characteristics map stored in fourth modeling unit 65 to generate variance VarAeff2 of second value Aeff2 is then to be calibrated on a test bench, for example, as a function of the input quantities supplied to fourth modeling unit 65. The variances of first pressure p1, second pressure p2, temperature T1 and gas flow rate mflow are derived, in the case of measurement of these quantities, from measurement inaccuracies reported by the manufacturer of the particular sensors, for example. These variances also derive from model inaccuracies in the case of modeling of these variables.

Variance VarAeff2 of second value Aeff2 is also sent to averaging unit 25.

Alternatively, it is also possible for only variance VarAeff1 of first value Aeff1 to be determined in the manner described here and sent to averaging unit 25 or for only variance VarAeff2 of second value Aeff2 to be determined in the manner described here and sent to averaging unit 25.

It is assumed below as an example and as described with reference to FIG. 2 that both variance VarAeff1 of first value Aeff1 as well as variance VarAeff2 of second value Aeff2 are sent to averaging unit 25. In forming arithmetic mean Aeff described in this example, first value Aeff1 is weighted as a function of variance VarAeff1 of first value Aeff1. Second value Aeff2 is weighted as a function of variance VarAeff2 of second value Aeff2.

For weighting of values Aeff1, Aeff2 as a function of particular variance VarAeff1, VarAeff2, the weighting of particular value Aeff1, Aeff2 may be selected to be larger, the smaller the particular variance VarAeff1, VarAeff2, e.g., according to an inverse proportionality. The sum of the weighting factors should be equal to the number of values Aeff1, Aeff2 sent to averaging unit 25 for the flow-through area of component 5, e.g., the effective flow-through area, e.g., equal to two in the present example. Use of a Kalman filter, for example, is believed to be conventional for such weighted averaging. It may be used, e.g., for averaging unit 25 and supplies resulting value Aeff as the result of weighted averaging. If a variance VarAeff1, VarAeff2 is received in averaging unit 25 for only one of two values Aeff1, Aeff2, then it is assumed that for the one of two values Aeff1, Aeff2 for which no variance is received in averaging unit 25, its variance is zero, and on this basis, both the received variance for the other of two values Aeff1, Aeff2, the Kalman filtering used in this example is performed in averaging unit 25 to form resulting value Aeff. If variance VarAeff1=0 or if this is assumed, then it is also assumed that value Aeff1 is correct so that regardless of VarAeff2, value Aeff=Aeff1 is set by the Kalman filtering. Conversely, VarAeff2=0 yields Aeff=Aeff2, regardless of value VarAeff1. If no variance is received in averaging unit 25 for either of two values Aeff1, Aeff2, then both values Aeff1, Aeff2 are weighted equally with a value of 1 in averaging unit 25, so that resulting value Aeff is obtained according to equation (4).

In another step, depending on resulting value Aeff, a corrected value for at least one input quantity of the second model is formed using the second model. In doing so, the measured or modeled signals of first pressure p1, second pressure p2, temperature T1 and/or gas flow rate mstrom may be corrected so that the throttle equation (1) is satisfied for resulting value Aeff, e.g., based on equation (3) it holds that:

$$Aeff = \frac{mstrom * \sqrt{R * T_1}}{p_1 * \psi(\pi)}. \tag{5}$$

This correction is illustrated in FIG. 3 for first pressure p1 in the form of a block diagram representative of all input variables of the second model. Resulting value Aeff is sent to a fifth modeling unit 75. Fifth modeling unit 75 here includes a third model, which is derived from the second model and to which resulting value Aeff is sent as an input variable and which delivers at its output a corrected value p1' for the first pressure. The third model is obtained here by solving equation (5) for first pressure p1, the resulting value for first pressure p1 then being regarded as corrected value p1'. It is assumed here that temperature T1, second pressure p2 and gas flow rate mstrom are constant. Measured or modeled value p1 for the pressure may be subtracted by a subtraction unit 80 from corrected value p1' for the first pressure to determine deviation Δp1 between corrected value p1' and measured or modeled value p1 for the first pressure. The determination of differential value Δp1 by subtraction unit 80 is to be understood as being optional. It is thus possible to provide a correction unit 70 which includes at least fifth modeling unit 75 and optionally also subtraction unit 80 as illustrated in FIG. 3.

According to equation (5), it may be sufficient, as described for first pressure p1, to correct only one input variable of the second model for equation (5) in order to satisfy equation (5). However, that would not be optimal.

According to an optimized method, it may be better to correct all the input variables of the second model in proportion to gradient $$\frac{\partial Aeff}{\partial x} \quad (6)$$

where x=p1, p2, T1, mstrom.

In other words, all the input variables of the second model are corrected somewhat, and with all the corrections together, equation (5) is again correct. Equation (6) describes the sensitivity of resulting value Aeff for the effective flow-through area of component 5 with respect to variable x.

The correction of first pressure p1, for example, has the greater weight, the greater the product of variance Varp1 and the sensitivity of resulting value Aeff for the effective flow-through area of component 5 with respect to first pressure p1. This sensitivity depends greatly on the operating point of internal combustion engine 1. The operating point of internal combustion engine 1 is considered as a function of pressure ratio p1/p2 over component 5. In a range p1/p2≈1, the sensitivity of resulting value Aeff with respect to a change in first pressure p1 or second pressure p2 is very great. Therefore, in this operating range of internal combustion engine 1, almost exclusively pressures p1, p2 are corrected using the optimized method. The greater the deviation of pressure ratio p1/p2 from a value of 1, the lower is the sensitivity of resulting value Aeff with respect to a change in first pressure p1 or second pressure p2 and the less are pressures p1 and p2 corrected. The correction of second pressure p2 may be performed like the correction of first pressure p1 in the manner described with reference to FIG. 3. The correction of temperature T1 and the correction of gas flow rate mstrom may be performed similarly. For each of these corrections, a corresponding correction unit like that illustrated in FIG. 3 as an example may be provided so that the specified corrections may also proceed simultaneously.

In this context, sensitivity also refers to the sensitivity of resulting value Aeff with respect to signal errors in first pressure p1 or second pressure p2, such as those which may occur due to noise or offset, for example. In the operating range described here in which pressure ratio p1/p2 equals approximately a value of 1, minor signal errors in first pressure p1 or second pressure p2 result in comparatively major errors in calculated resulting value Aeff. The greater the difference between pressure ratio p1/p2 and value 1, the smaller are the errors of resulting value Aeff for the same signal errors of first pressure p1 or second pressure p2. However, the signal errors described here for the corrected input quantities of second model 20 may be largely compensated by the correction described with reference to FIG. 3.

Using the method and device hereof, it may be possible to calculate an optimum resulting value Aeff for the effective flow-through area of component 5 on the basis of available information such as sensor signals and/or modeled signals, e.g., in this example p1, p2, T1, mstrom and also triggering signals, e.g., in this example TV. This is possible with the help of the characteristic curves and engine characteristics maps and/or computation procedures in the modeling units for all operating conditions of internal combustion engine 1. It may thus be possible to calculate resulting value Aeff as accurately as possible under all operating conditions of internal combustion engine 1.

The method and device hereof are described above using a first value and a second value for the effective flow-through area of component 5. In general, this may also be a first value and a second value, each being representative of the flow-through area of component 5, e.g., a degree of opening of component 5, for example. In addition, the accuracy of the resulting value may be increased if, in addition to the first value and the second value, at least one third value is used, which is representative of the flow-through area of component 5, e.g., the effective flow-through area, and which is determined by a model as a function of a triggering signal of the adjustable component or as a function of at least one performance variable of internal combustion engine 1 which is different from the triggering signal. In the case of the triggering signal, however, another triggering signal than the triggering signal used for calculation of the first value may be used. If, for example, the pulse-duty ratio is used as the triggering signal for formation of the first value, then the valve lift may be the third value. When using at least one performance quantity of the internal combustion engine different from the triggering signal to form the at least one third value, it is then at least one performance quantity which is in operative relationship to component 5 and is different from the performance quantities of the internal combustion engine used to form the second value.

In determining second value Aeff2 as illustrated in FIG. 2, it is also possible for second value Aeff2 to be determined by the second model in second modeling unit 20 as a function of more than or fewer than the input variables illustrated. This is the case, e.g., when instead of the throttle equation (1) for formation of the second model, an engine characteristics map that is to be calibrated on a test bench, for example, is used for the second model. If only one input quantity is used for the second model, the second model may also be designed as a characteristic curve.

What is claimed is:

1. A method for operating an internal combustion engine having an adjustable component through which a gas flows and by whose setting the gas flowing through the component is influenced, comprising:

determining at least one first value representative of a flow-through area of the component in accordance with a first model as a function of a triggering signal of the component;

determining at least one second value representative of the flow-through area of the component in accordance with a second model as a function of at least one performance quantity of the internal combustion engine different from the triggering signal; and forming a resulting value for the flow-through area as a mean of the at least one first value and the at least one second value.

2. The method according to claim 1, wherein the internal combustion engine is arranged in a motor vehicle.

3. The method according to claim 1, wherein the at least one first value is representative of an effective flow-through area of the component.

4. The method according to claim 1, wherein the at least one second value is representative of an effective flow-through area of the component.

5. The method according to claim 1, wherein the resulting value is formed in the forming step by averaging the at least one first value and the at least one second value with weighting.

6. The method according to claim 1, wherein the at least one first value and the at least one second value are representative of an effective flow-through area of the component.

7. The method according to claim 1, wherein the at least one second value is determined in accordance with the second model as a function of a first pressure upstream from the component, a second pressure downstream from the component, a temperature upstream from the component and a mass flow rate through the component.

8. The method according to claim 1, further comprising forming a corrected value for at least one input quantity of the second model as a function of the resulting value via the second model.

9. The method according to claim 1, wherein the component includes at least one of (a) a throttle valve, (b) an exhaust gas recirculation valve and (b) a turbine.

10. The method according to claim 1, wherein the flow-through area of the component is an effective flow-through area.

11. A method for operating an internal combustion engine having an adjustable component through which a gas flows and by whose setting the gas flowing through the component is influenced, comprising:

determining at least one first value representative of a flow-through area of the component in accordance with a first model as a function of a triggering signal of the component;

determining at least one second value representative of the flow-through area of the component in accordance with a second model as a function of at least one performance quantity of the internal combustion engine different from the triggering signal; and forming a resulting value for the flow-through area as a mean of the at least one first value and the at least one second value, wherein the resulting value is formed in the forming step by averaging the at least one first value and the at least one second value with weighting, and the method further comprises:

determining a variance of the at least one first value at least one of (a) as a function of tolerances in the first model and (b) as a function of a variance of the triggering signal, the weighting of the at least one first value determined as a function of the variance of the at least one first value.

12. The method according to claim 11, wherein the weighting of a value representative of the flow-through area of the component is selected to be the greater, the smaller its variance.

13. A method for operating an internal combustion engine having an adjustable component through which a gas flows and by whose setting the gas flowing through the component is influenced, comprising:

determining at least one first value representative of a flow-through area of the component in accordance with a first model as a function of a triggering signal of the component;

determining at least one second value representative of the flow-through area of the component in accordance with a second model as a function of at least one performance quantity of the internal combustion engine different from the triggering signal; and forming a resulting value for the flow-through area as a mean of the at least one first value and the at least one second value, wherein the resulting value is formed in the forming step by averaging the at least one first value and the at least one second value with weighting, and the method further comprises:

determining a variance of the at least one second value at least one of (a) as a function of tolerances of the second model and (b) as a function of a variance of the at least one of (a) a modeled and (b) a measured performance quantity of the internal combustion engine different from the triggering signal, the weighting of the at least one second value determined as a function of the variance of the at least one second value.

14. The method according to claim 13, wherein the weighting of a value representative of the flow-through area of the component is selected to be the greater, the smaller its variance.

15. A device for operating an internal combustion engine having an adjustable component through which a gas flows and by whose setting the gas flowing through is influenced, comprising:

at least one first modeling unit adapted to model a first value representative of a flow-through area of the component as a function of a triggering signal of the component;

at least one second modeling unit adapted to model a second value representative of the flow-through area of the component as a function of at least one performance quantity of the internal combustion engine different from the triggering signal; and an averaging unit adapted to form a resulting value for the flow-through area as a mean of the at least one first value and the at least one second value.

16. The device according to claim 15, wherein the internal combustion engine in arranged in a motor vehicle.

17. The device according to claim 15, wherein the flow-through area of the component is an effective flow-through area.

* * * * *